July 18, 1961 H. R. POETKER Re. 25,010

COLLAPSIBLE DERRICKS

Original Filed Feb. 13, 1953 2 Sheets-Sheet 1

INVENTOR.
HENRY R. POETKER.
BY
Attorney.

July 18, 1961 H. R. POETKER Re. 25,010

COLLAPSIBLE DERRICKS

Original Filed Feb. 13, 1953 2 Sheets-Sheet 2

INVENTOR.
HENRY R. POETKER
BY
Attorney.

United States Patent Office

Re. 25,010
Reissued July 18, 1961

25,010
COLLAPSIBLE DERRICKS

Henry R. Poetker, 3811 N. Lassen Ave., Kerman, Calif., assignor of fifty-one percent to William Henry Foreman, Fresno, Calif.

Original No. 2,822,895, dated Feb. 11, 1958, Ser. No. 336,790, Feb. 13, 1953. Application for reissue Feb. 8, 1960, Ser. No. 7,735
6 Claims. (Cl. 189—15)

Matter enclosed in heavy brackets [ ] appears in the original patent but forms no part of this reissue specification; matter printed in italics indicates the additions made by reissue.

This invention relates to collapsible derricks, of the type shown in my Letters Patent No. 2,551,286.

This invention solves certain problems developed in connection with the derrick of the patent, and makes it possible to have a taller derrick and to raise and lower it more easily. Among the salient object of the present invention are:

To provide a collapsible derrick of the character referred to having a supporting sub-structure *and a base skid frame* which can be easily loaded on to a truck for transportation, and which can be slid off of said truck at the place where it is to be used;

To provide such a sub-structure having a removable section which can be removed after the derrick is set up for use, and so as to give clearance for oil well pump jacks and the like;

To provide improvements in the lower end of the derrick and the brace frame or supporting lever frame pivotally connected therewith, and which makes is possible to raise a taller derrick structure from a horizontal position to a vertical or operating position by means of a cable and power means therefor;

To provide in connection with a derrick structure, a brace or lever frame structure having a portion, referred to as an elbow, which can be bolted or secured to the derrick proper when it is in its upright position;

To provide in a derrick structure of the character referred to, a lower section which is detachable [from the] *from an upper section of the* derrick [proper] for transportation purposes together with an inclined slide-way [or frame] for said lower detachable section of the derrick, and which skid frame is also detachable whereby to shorten the overall structure for transportation purposes.

Other object and improvements will be apparent from the following detailed description of one practical embodiment of the invention, taken with the accompanying two sheets of drawings, in which.

Figure 1:
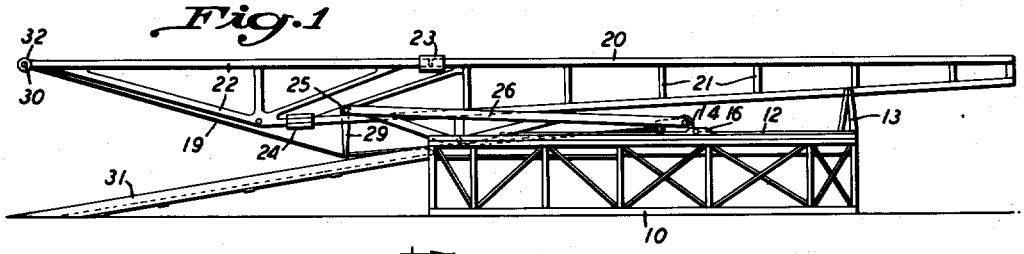
FIGURE 1 is a side elevation of my improved collapsible derrick in its collapsed condition, but before the lower section and the inclined slide-way have been detached.

Referring now more in detail to the drawings, a supporting sub-structure of rectangular form is shown in FIGS. 1 [and], 2, and [also in end view in FIG.] 5, *is generally identified by the numeral* [. This supporting sub-structure is designated as a whole] 10, and may be built of any suitable material [,] and in any desired size. *The sub-structure is adapted to support a derrick tower, generally indicated by the numeral 20 and having upper and lower end portions, for movement between upright and substantially horizontally reclined down positions.* In the present form, there are two long side box-like structures [, as] 10′ [, 10′, with] *and* two removable short end sections [, as] 10″ [, 10″,] at [the] *a* front end of said [main] *side* structures. [, and which can be] *The end sections are* removed after the derrick is set up for use, in order to give clearance at the front end of the structure for well equipment, *not shown.*

Figure 3:
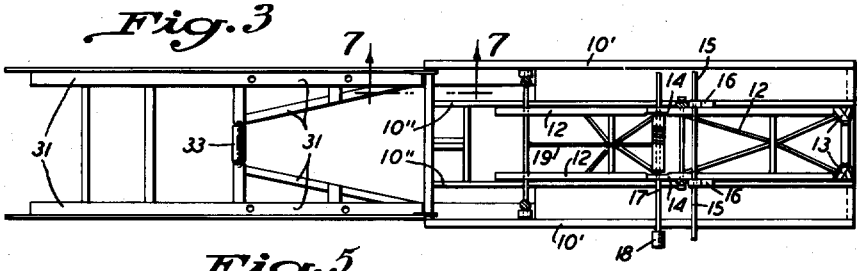
FIGURE 3 is a plan view looking down on the supporting structure from the position of line 3—3 on FIG. 2.
Figure 5:
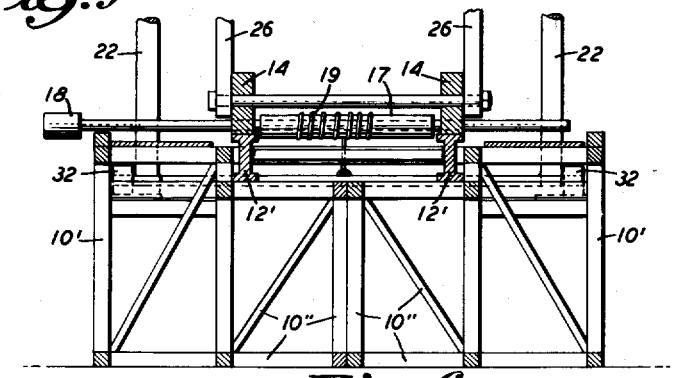
FIGURE 5 is a fragmentary vertical sectional view taken on line 5—5 on FIG. 2.

Mounted on said supporting sub-structure 10 is a horizontal base [or] skid frame [designated] 12 [,] having [at one] *a forward end, a rear* end [an], *and an* upstanding bracket 13 [, to receive] *at said rear end for receiving* the upper end *portion* of the derrick *tower 20* when it is lowered into its horizontal position. Said skid frame 12 also has intermediate its ends two side bearing members [, 14,] 14 [,] forming a pivot bearing for [the] *a* brace lever frame [, again referred to,] *26* and also for supporting a windlass *17* for a cable [, also again referred to] *19*. [This horizontal base structure or] *The* skid frame 12 is anchored to the supporting substructure 10, by means of a cross shaft 15 [, resting] *which rests* in open recesses in the side bearing members [14, 14,] and *extends* through two lug members [,] 16 [, 16,] on the adjacent top sides of the skid frame [12], as seen in FIG. 3. By removing this cross shaft [or rod 15], it is possible to slide the [long] skid frame [12] off of said supporting substructure 10. The [lower opposite side members of said] skid frame [12 are shown in the] *provides lower opposite* [form of] I-beams [12′ ,] 12′, [in section] *as seen* in FIG. 5. The bearing [brackets or] members [14, 14] are [shown] mounted on top of said I-beams. [A] *The* cable windlass [, as 17, is shown] *has oppositely extended ends borne by* [as having its bearings in] said *bearing members* [brackets 14, 14,] with one end extended and provided with a drive pulley [, as] 18, or other means for applying power to said windlass for winding [a] *the* cable 19 thereon [, and again referred to].

Figure 2:
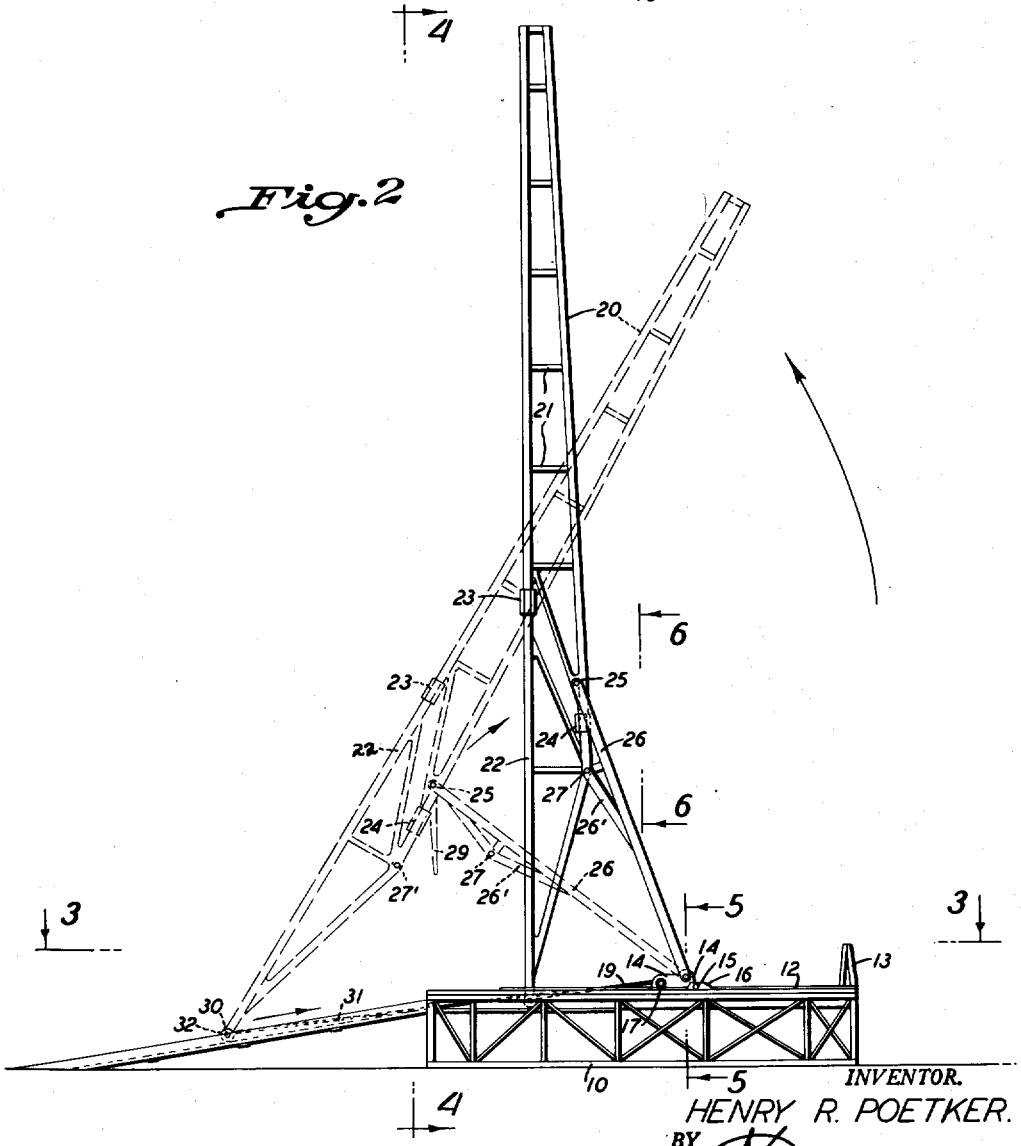
FIGURE 2 is a side elevation of the derrick in its raised or operating position, with a partially raised position thereof indicated in light broken lines.
Figure 4:
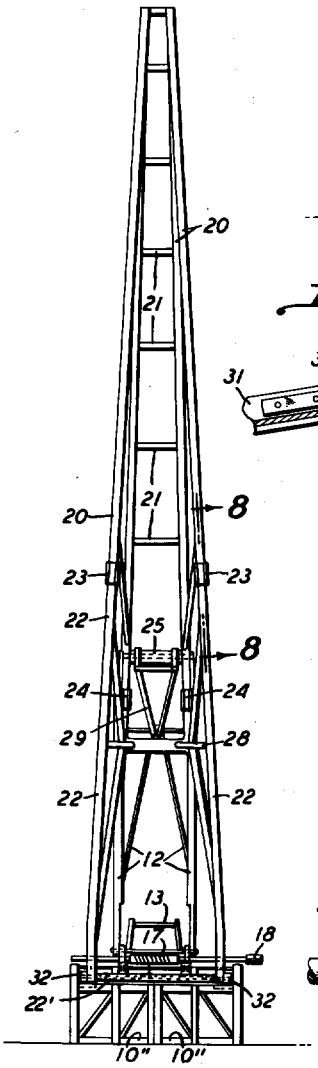
FIGURE 4 is a front elevation of the derrick in its raised position, as seen from the line 4—4 on FIG. 2.

The derrick *tower* [frame proper is designated] 20 [, and] is shown to be somewhat tapering to its smaller *or upper* end [,] which, when *in said* down *position,* rests on the upstanding bracket 13. The [brace members of the] derrick [, designated 21, are] *tower has relatively* short *transversely extended brace members 21* [cross pieces] as seen in FIGS. 2 and 4. The derrick tower is [composed] *constructed* of round members, as here shown, but might be made of any general construction.

Figure 8:
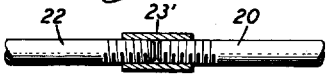
FIGURE 8 is a detail showing one method of connecting the members of the detachable lower end of the derrick.

[A] *The* lower end [section] *portion* of said tower [or derrick] *20* [is shown and] is designated [as a whole] *by the number* 22, and [its] *includes* members [are] connected to the *upper end portion of the tower* [derrick proper] at four [places, as at 23, 23, and 24, 24, at] longitudinally and vertically spaced positions *23, 23 and 24, 24,* as seen in FIGS. 1 and 2. These connections can be made [of] *with* internally threaded sleeves [, as] 23′ [,] having right and left hand threads in their opposite ends so that the two *connected* ends *of the members of the upper and lower end portions of the tower* will be connected and drawn together as said sleeve is put in place, as indicated in FIG. 8.

Figure 6:
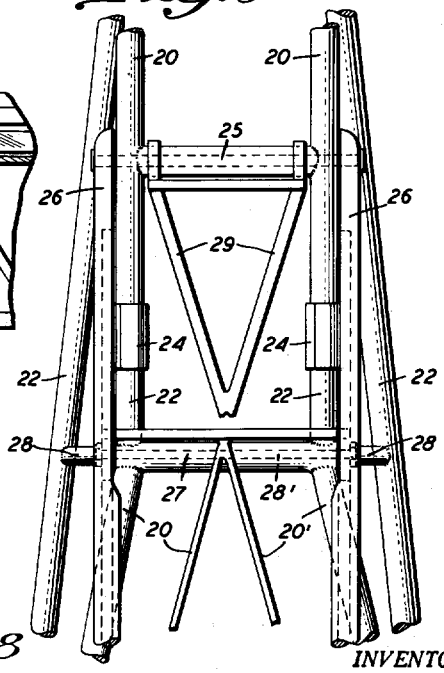
FIGURE 6 is a fragmentary view as seen from line 6—6, FIG. 2.

The upper *end portion of the* derrick *tower* [frame] *20* has a cross bearing [sleeve or] member [, as] 25 [,]

between its side members, as seen in FIGS. 4 and 6 , *said cross bearing member having outer ends extended outwardly of the tower.* To the outer ends of this bearing member 25 are connected the upper ends of a long brace lever *frame* [structure, designated] 26 [, the other]. *The lower* end of *the lever frame* [which] is pivotally connected to the [brackets 14,] *bearing members* 14, on the opposite sides of the skid frame 12. Said brace lever *frame* [or member 26] has side *elbow* portions [, as elbows, designated] 26', having bearings [connections, as at] 27 [,] *attachable* with the opposite sides of the *upper end portion of the* derrick *tower* [proper], after the [derrick] *tower* has been raised to its upright [or] operating position. [it will be seen that said elbow portions 26' of the brace lever member structure, and its pivot] *The bearings* 27 [,] come into register with another bearing 27' on the [derrick] *tower,* [structure] *and* indicated in the light broken line positions in FIG. 2, [before they] *as the tower and the lever frame* are moved together. [, as] *The fully registered position is* seen in full lines in [said] FIG. 2. These *bearings* [members] 27 and 27' are secured together by bolts [,] or a [through] rod, designated 28, *extended* through a bearing sleeve 28' *positioned* between the sides of the lower *end portion* [section] of the derrick *tower,* and which is detachable by [the] turning of the threaded sleeves 23, 23 and 24, 24. It will be seen that when the elbow portions of the [brace] *lever* frame [26], and the *lower end portion of the tower* [derrick extension portion or section 22,] are secured together at 27 *and 27'*, [that] the lower end *portion* of the [upright] derrick *tower and the lever frame are in substantially* [is of] A-form, as seen in full lines in FIG. 2, and that the [brace frame] lever *frame* is connected to the derrick *tower* [proper] at [two places, namely] 25 and 27. The connections at 25 are to the *upper end portion of the tower* [derrick proper], and the connections at 27 are to the [middle opposite sides of the] *lower end portion of the tower* [derrick extension]. This is clear from FIG. 2.

Hanging from the *bearing member* [pivot shaft at] 25, of the *tower* [derrick] *20* [proper], and *adjacent to* where the opposite ends of the brace *lever* frame 26 are connected, is a *cable positioning* [V-form] member 29, *of substantially* V-*form,* under the lower end of which passes the cable 19, from the windlass 17, said cable being extended to and connected [with], *at 30, to* the lower end of the *lower end portion of the* [extended] derrick *tower* [structure, as at 30,] whereby when the cable is pulled by the windlass, the lower *end portion* [extension] of the *tower* [derrick] moves *initially downwardly onto and thence* upwardly on [the] *an* inclined slide-way 31, to the supporting sub-structure *10* and on to the skid frame 12. *As illustrated in FIG. 6, the cable positioning member has a downwardly disposed apical notch for receiving the cable. As seen in FIG. 1, this apical notch is below the bearing member 25 when the tower is in a down position. The cable positioning member is pendantly supported on the bearing member 25 and thus normally hangs straight down. As the cable 19 is tightened, the positioning member holds the cable downwardly below the pivot axis of the tower so that when the cable is tensioned by the windlass, the lower end portion 22 of the tower rocks downwardly relative to the bearing member 25. During the initial rocking action, the friction of the cable on the positioning member causes it to pivot with the tower. During subsequent movement, the positioning member moves upwardly from the cable. When this happens, it is then free of the cable and pivots downwardly where it is available and properly positioned when next needed to hold the cable as the tower is lowered.*

Figure 7:
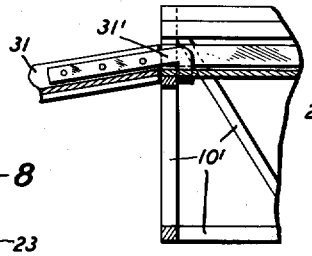
FIGURE 7 is a detailed view, at line 7—7 on FIG. 3, showing the upper end of the inclined slide-way detachably hooked to the supporting sub-structure.

*The* [An inclined and detachable] slide-way [designated] 31, is provided to furnish a slide-way for the lower end of said derrick *tower 20.* [extension, which is provided with rollers] *Rollers* [, as] 32 [, 32, to run on the] *are mounted on the lower end of the tower relatively adjacent to the connection 30 for rollable engagement with* trackways in said inclined slide-way, as seen in FIGS. 1 and 2. A roller, as 33, may be provided in said slide-way [31], as seen in FIG. 3, for the cable 19 to run on when said *tower* [extension] is being pulled to the upright position, as seen in FIG. 2. Said [inclined structure 31] *slide-way* is provided at its upper ends, at opposite sides *thereof,* with hooks 31' [, 31',] to hook on to the upper portions of the two side box-like structures 10' [, 10'], as clearly seen in FIG. 7. The lower [ends] *end portion 22* of the derrick *tower 20* [extension 22 are connected with] *has* a cross bar 22' *connected thereto as seen in* [,] FIG. 4, and to this *bar* the cable 19 is connected *at 30* for pulling said *lower end portion of the tower down toward and* [extension] up the inclined *slide*-way [31], and to the upright operating position, seen in full lines in FIG. 2 [, and where the long brace structure of A-frame 26 is shown in place, with its elbow or angle portion 26' secured to the tower, as at 27]. *It will be understood that the brace frame 26 and elbow portion 26' thereon form an angle with the lower end portion 22 of the tower which angle is a maximum when the tower and brace frame are reclined and a minimum when the tower and brace frame are erect.*

It is stated that the two long side box-like structures 10' [, 10'] of the sub-structure 10 are separate and can be separately moved to the place of use, and assembled to receive the skid-frame 12 with the [derrick] tower thereon from the truck , *not shown,* which transported it.

Thus I have provided an improved collapsible derrick with a detachable lower *end portion,* [section and] with a [type of] brace *lever frame* [structure] which makes it practical to have a taller derrick tower when set up for use, *with a* V-*form member guiding the cable for raising and lowering the tower* and which tower can be taken down conveniently for transportation from one place to another.

I am aware that changes in details of construction and arrangement can be made without departing from the spirit of the invention, and I do not, therefore, limit the invention to the details and the specific embodiment of the invention shown and described for explanatory purposes, except as I may be limited by the hereto appended claims.

Having described my invention, what I claim as new and desire to secure by Letters Patent is:

1. A collapsible derrick of the character shown and described including [an elongate] *a substantially* horizontally disposed supporting base structure having front and rear ends, an elongate horizontally disposed brace frame with one end pivotally mounted on the top of said base structure at a point intermediate its ends and projecting forwardly therefrom, said brace frame having a depending elbow portion formed on its under side [at a point] intermediate its ends and offset from the line of said brace frame, a derrick tower structure resting *substantially* horizontally on said base structure to extend longitudinally thereof and pivotally connected with the forwardly projecting free end of said brace frame at a point intermediate its ends, the end portion of said tower structure projecting forwardly [from the base tapering to its end and projecting] beyond the supporting base structure, means connected with said [tapered] *projected* end of the tower structure for pulling said end rearwardly relative to the base and the pivotal axis of the brace frame and thereby shift the tower structure upwardly to [a vertical] *an upright* operating position, [the angle of] said elbow portion on the brace frame and the end portion of said tower structure [adjacent the beginning of the taper coming together when] *defining an angle therebetween which is smaller when* the tower structure is in a vertical position *than when the tower structure is resting substantially horizontally,* and fastening means for connecting said elbow portion to said tower structure at a point below the pivotal connection therebetween.

2. A collapsible derrick as set forth in claim 1 in which the [tapered] *projected* end of said tower structure is detachable for reducing the length of said derrick tower structure for transportation, the elbow portion of said brace member being connected with said detachable portion of said tower structure for holding said tower structure in vertical operating position.

3. A collapsible derrick as set forth in claim 1 in which the supporting base structure has a removable section to give clearance space for well equipment after the base structure and said derrick have been set up for operation.

*4. A collapsible derrick including a substantially horizontal supporting base having predetermined front and rear ends, a brace frame having opposite upper and lower ends with the lower end pivotally mounted on the base intermediate the ends of the base for movement between a reclined position with the upper end projecting forwardly from the front end of the base and a position upwardly extended from the base, said frame having an elbow portion laterally offset therefrom intermediate the ends of the frame and depending therefrom in said reclined position, a tower having upper and lower end portions, means pivotally connecting the upper end of the frame to the tower intermediate the upper and lower ends of the tower for movement of the tower between a reclined position on the base when the frame is in reclined position and a position upwardly extended from the base when the frame is in its upwardly extended position, the lower end portion of the tower projecting forwardly from the base in the reclined position of the tower, means interconnecting the base and the lower end portion of the tower for pulling said lower end rearwardly relative to the base and to the pivotal interconnection of the frame and the tower when said frame and tower are both in reclined position for moving the tower upwardly to its upwardly extended position, the elbow portion and the lower end portion of the tower having a maximum angular relation in said reclined positions and a minimum angular relation in said upwardly extended position, and fastening means releasably interconnecting the elbow portion and the tower below the pivotal connection of the frame to the tower when said tower and frame are in upwardly extended positions.*

*5. In a collapsible derrick, a base; an elongated slide-way outwardly extended from the base; an elongated brace having upper and lower ends; means pivotally connecting the lower end of the brace to the base in spaced relation to the slide-way for movement about a substantially horizontal first pivot axis disposed transversely of the slide-way between a position upwardly extended from the base and a reclined position on the base with upper end of the brace extended over the slide-way; an elongated tower having upper and lower ends; means pivotally interconnecting the upper end of the brace and the tower intermediate the upper and lower ends of the tower for pivotal movement of the tower about a second pivot axis substantially parallel to said first pivot axis between a reclined position overlying the brace and with the lower end of the tower extended over the slide-way, and a position upwardly extended from the base when the brace is in its upwardly extended position; an elongated flexible cable having a first end connected to the lower end of the tower and an opposite end, the connection of said first end of the cable to the tower being above said second pivot axis in the reclined position of the tower; power means connected to said opposite end of the cable and mounted on the base on the opposite side of said second pivot axis from the lower end of the tower when the tower is in reclined position for applying tension to the cable; and cable positioning means borne by the interconnected tower and the brace, adjacent to and downwardly extended from said second pivot axis, and engageable with the cable between the ends thereof when the tower is in reclined position for holding the cable below said second pivot axis whereby tensioning of the cable pulls the lower end of the tower down onto the slide-way and along the slide-waytoward the pivotal connection of the brace to the base.*

*6. In a collapsible derrick, a substantially horizontal base; an elongated slide-way outwardly and downwardly extended from the base; an elongated brace having upper and lower ends; means pivotally connecting the lower end of the brace to the base for movement between a position upwardly extended from the base and a reclined position on the base with upper end of the brace extended over the slide-way; an elongated tower having upper and lower ends; means pivotally interconnecting the upper end of the brace and the tower intermediate the upper and lower ends of the tower for pivotal movement of the tower between a reclined position overlying the brace in its reclined position and with the lower end of the tower extended over the slide-way and above the pivotal connection of the brace to the tower, and a position upwardly extended from the base when the brace is in its upwardly extended position; a cable positioning member connected to the tower at the pivotal connection of the tower and the brace and extended downwardly from the tower above the slide-way when the tower is in its reclined position; a windlass mounted on the base on the opposite side of said guiding member from the lower end of the tower in its reclined position; and an elongated flexible cable extended under and engaging the guide member having an end connected to the lower end of the tower and an opposite end connected to the windlass.*

References Cited in the file of this patent or the original patent

UNITED STATES PATENTS

| | | |
|---|---|---|
| 1,473,054 | Smith et al. | Nov. 6, 1923 |
| 2,268,796 | Brauer | Jan. 6, 1942 |
| 2,335,584 | Couse | Nov. 30, 1943 |
| 2,344,390 | Cohen | Mar. 14, 1944 |
| 2,365,370 | Woolslayer et al. | Dec. 19, 1944 |
| 2,429,010 | Woolslayer et al. | Oct. 14, 1947 |
| 2,471,492 | Moore | May 31, 1949 |
| 2,551,286 | Poetker | May 1, 1951 |